United States Patent
Henschel et al.

(10) Patent No.: US 6,679,694 B1
(45) Date of Patent: Jan. 20, 2004

(54) FORMING STATION WITH A GRAVIMETRIC DOSING BELT SCALE FOR WOOD CHIPS AND FIBERS

(75) Inventors: Walter Henschel, Otzberg (DE); Guenter Natus, Muehltal (DE); Lutz Wolf, Darmstadt (DE)

(73) Assignee: Dieffenbacher Schenck Panel GmbH, Pfungstadt (DE)

( * ) Notice: Subject to any disclaimer, the term of this patent is extended or adjusted under 35 U.S.C. 154(b) by 0 days.

(21) Appl. No.: 09/958,837

(22) PCT Filed: Apr. 12, 2000

(86) PCT No.: PCT/EP00/03281
  § 371 (c)(1),
  (2), (4) Date: Oct. 12, 2001

(87) PCT Pub. No.: WO00/61342
  PCT Pub. Date: Oct. 19, 2000

(30) Foreign Application Priority Data

Apr. 12, 1999 (DE) .......................................... 199 16 462

(51) Int. Cl.⁷ .................................................. B27N 3/14
(52) U.S. Cl. ..................................... 425/83.1; 425/148
(58) Field of Search ............................. 425/80.1, 83.1, 425/140, 148; 264/40.4, 40.7, 109; 198/339.1, 341.04, 341.09

(56) References Cited

U.S. PATENT DOCUMENTS

| 3,737,265 A | * | 6/1973 | Schafer et al. ............... 425/140 |
| 4,038,531 A |   | 7/1977 | Loe, Jr. |
| 4,247,497 A |   | 1/1981 | Wolf |
| 4,458,827 A |   | 7/1984 | Stelte |
| 4,557,882 A | * | 12/1985 | Arnold ....................... 264/40.4 |
| 5,171,498 A | * | 12/1992 | Powell ......................... 264/113 |
| 5,395,564 A | * | 3/1995 | Frisbie et al. .............. 264/40.4 |
| 5,854,426 A | * | 12/1998 | Benda ......................... 73/432.1 |

FOREIGN PATENT DOCUMENTS

| DE | 947640 | 8/1956 |
| DE | 1088697 | 9/1960 |
| DE | 3018205 | 11/1981 |
| DE | 3309744 | 10/1984 |
| DE | 3437114 | 4/1986 |
| DE | 3938681 | 5/1991 |
| DE | 4113843 | 10/1992 |
| DE | 19541818 | 5/1997 |
| EP | 0257117 | 3/1988 |
| GB | 2136754 | 9/1984 |

OTHER PUBLICATIONS

Firma Carl Schenck AG, Darmstadt, Germany, Company Prospectus, "Formstation"; SP 0208, Issued, Mar. 1985.

* cited by examiner

Primary Examiner—James P. Mackey
Assistant Examiner—Donald Heckenberg
(74) Attorney, Agent, or Firm—W. F. Fasse; W. G. Fasse

(57) ABSTRACT

A spreading station for spreading chip or fiber panels, includes a dosing belt scale (2) to provided between a dosing hopper (1) and a spreading head (3). The dosing belt scale (2) is connected to a regulating unit (4, 22) with which the conveying rate (kg/s) of the chip or fiber material on the dosing belt scale (2) is gravimetrically regulatable based on a prescribed fleece weight or a prescribed nominal conveying rate that is to be achieved.

10 Claims, 2 Drawing Sheets

FORMING STATION WITH A GRAVIMETRIC DOSING BELT SCALE FOR WOOD CHIPS AND FIBERS

FIELD OF THE INVENTION

The invention relates to a forming station for chip or fiber panels.

BACKGROUND INFORMATION

In the production of chip and fiber panels, flowable materials such as chips or fibers provided with binder agents are discharged out of a metering or dosing hopper and delivered by a conveyor or transport apparatus to a spreading head, by means of a forming station. A material mat or fleece of the chips or fibers is spread by the spreading head onto a continuously running forming belt, and this material mat or fleece is then pressed to form a panel in a pressing station. Since panels of various different thicknesses and various different material compositions are usually to be spread with such forming stations, the spreading of the material fleece must be exactly regulatable, in order to produce a homogeneous panel quality that remains as constant as possible.

Such a spreading station is previously known from the company prospectus "Forming Station", SP 0208, issue of March 1985, by the company Carl Schenck AG in Darmstadt. This forming station consists of a metering or dosing hopper, out of which the glued chips are discharged by means of a floor belt and discharge rollers over the entire width. This constant chip flow is delivered by means of a conveyor or transport apparatus to the spreading head, which spreads the chips into a material mat or fleece on a continuously running forming belt arranged thereunder. In this context, the entire process sequence of the material flow is automatically regulatable. For this purpose, a surface area weight or weight-per-unit-area scale is arranged behind the spreading head, and determines the actual weight per unit area (kg/m$^2$) and compares it with a prescribed rated weight per unit area value. The determined regulation deviation is then regulated out by appropriate control of the transport speed of the discharge rollers and of the floor belt in the dosing hopper. By this regulation of the transport speed of the discharge rollers and of the floor belt, it is not taken into account, that the discharge material of the chips or fibers is strongly dependent on its flowability, its specific weight or density, and also its Ad degree of gluing. A regulation of such type is therefore relatively inexact, and mostly only regulatable in longer cycles, whereby in the intermediate time, considerable quantities of deviating fiber mat or fleece will be spread, which will lead to panels of reduced quality.

SUMMARY OF THE INVENTION

It is therefore the object of the invention, to improve the regulation of the material flow so that the mass of the spread material mat or fleece is very constant.

This object has been achieved by the invention in a forming station comprising at least one dosing hopper, out of which a total material flow of flowable materials comprising wood chins or fibers provided with a binder agent, is discharged onto a conveying apparatus and delivered by the conveying apparatus to at least one spreading apparatus, which spreads the total material flow of the chips or fibers in a controllable quantity to form a fleece thereof onto a forming belt, wherein the conveying apparatus comprises a dosing belt scale which is arranged between the dosing hopper and the spreading apparatus, and by means of which an actual conveying rate of the total material flow on the dosing belt scale is determined as a mass per unit time, and further comprising a regulating unit, which regulates the conveying of the total material flow by the dosing belt scale based on the determined actual conveying rate (kg/s) and in consideration of a prescribed nominal conveying rate (kg/s). Further details and advantageous example embodiments of the invention are recited in the dependent claims.

With the invention, a high regulation quality of the spread-out material fleece is advantageously also achievable, because the prescribed weight per unit area of the material to be spread out is regulated directly by means of the detected weight of the delivered material. Thereby, a very stable and rapid stabilizing or regulating-out of any regulation deviations can be advantageously achieved, because a deviation is detected in the delivered material directly before or in front of the spreading-out process, and is then immediately readjusted to be regulated in terms of weight.

BRIEF DESCRIPTION OF THE DRAWINGS

The invention will be described in greater detail in connection with an example embodiment, which is illustrated in the drawing.

It is shown by.

DETAILED DESCRIPTION OF PREFERRED EXAMPLE EMBODIMENTS OF THE INVENTION

Figure 1:
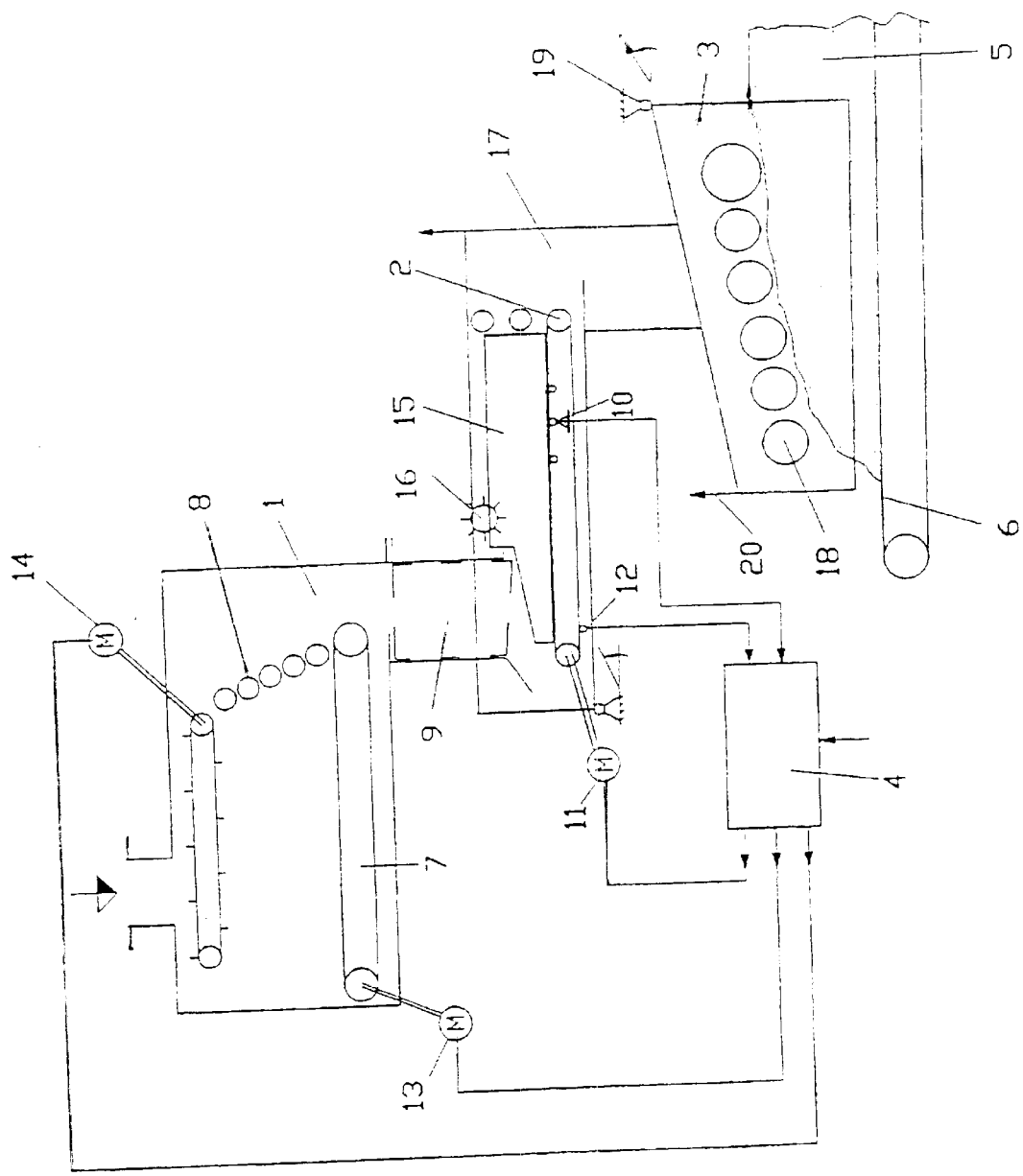
FIG. 1: a forming station with a dosing hopper, dosing belt scale, spreading head and forming belt.

In FIG. 1 of the drawing, a spreading station is illustrated, which includes a metering or dosing hopper 1 with a subsequent or following regulatable dosing belt scale 2 with regulator 4, a spreading head 3, and a forming belt 6.

The dosing hopper 1 includes regulatable discharge rollers 8 and to regulatable floor belt 7, with which the discharge quantity out of the dosing hopper 1 is regulatable. The flowable materials, such as, for example, glued wood fibers or chips, which are llocated in the dosing hopper 1, are discharged out of the dosing hopper 1 over the entire width. The regulatable dosing belt scale 2, to which the material flow is delivered via a delivery chute or shaft 9, is arranged under the dosing hopper 1. The dosing belt scale 2 includes one or more gravimetric weighing apparatus, which detect the weight per unit surface area and time being moved over the belt as a conveyor or transport rate (kg/s) or delivery rate. Mostly this is achieved by means of one or more support roller stations 10 that are supported on load cells. The dosing belt scale 2 further includes a speed regulated drive motor 11, which drives the transport or conveyor belt with a prescribed or regulated speed. Furthermore, a speed sensor 12 arranged on the bottom side of the dosing belt scale 2, and by means of this speed sensor the actual conveying or transporting speed or the belt speed of the dosing belt scale 2 is detected. The speed sensor 12 is mostly embodied as a friction wheel with a coupled pulse generator, which generates-voltage pulses, of which the number is proportional to the belt speed.

A regulating unit 4 is connected to the dosing belt scale 2, and both the weight as well as the speed signals are provided to the regulating unit. On the output side, the regulating unit 4 is further connected with the drive motor 11 of the dosing belt scale 2, the drive motor 13 of the floor belt, and the drive motor 14 of the discharge roller set. The dosing belt scale 2 is provided with adjustable side walls above the transport or conveyor belt, and with these side walls the desired transport or spreading width is adjustably settable. Additionally, a height-adjustable equalizing roller 16 is further provided, with which the chip or fiber material is uniformalized.

A vertical chute or shaft 17 is arranged at the end of the dosing belt scale 2, and the continuously transported fiber or chip material is moved through this vertical shaft 17 into the spreading head 3. Plural spreading rollers 18 arranged transversely or crosswise relative to the transport direction are provided in the spreading head 3, and by means of these spreading rollers 18, a material fleece 5 is spread onto the forming belt 6 and delivered to a following pre-press or panel press. Since mostly continuous pressing stations are utilized in such panel production processes, the forming belt 6 must be driven with a constant prescribed forming belt speed. Insofar as fiber panels are to be spread with the spreading head 3, the spreading head 3 is height-adjustably arranged by means of a rotational bearing element 19 and a stroke apparatus 20 that is not illustrated, whereby the height to be adjustingly set is given from the panel thickness that is to be produced.

The above described spreading station according to FIG. 1 of the drawing operates according to the following method:

In operation, the dosing hopper 1 is continuously filled with glued chips or fibers. Due to the desired panel thickness and width, a prescribed fleece height and width must be continuously spread onto the forming belt 6. That results in a prescribed conveying quantity of fiber or chip-material, which is deliverable to the spreading head. A corresponding nominal or rated conveying rate as mass per time is prescribable or inputtable into the regulating unit 4. The regulating unit may, however, also be embodied in such a manner so that simply the panel thickness to be produced is inputtable, and from this the nominal rated conveying rate is determinable in connection with the fleece thickness that is to be spread. From that, the regulating unit 4 calculates a certain conveying speed of the discharge elements, such as of the floor belt 7 and of the discharge rollers 8, and adjusts the drive motors 13, 14 thereof to the corresponding rotational speed. The dosing hopper 1 may, however, also be controlled with the corresponding discharge speed by other control organs.

By means of the adjusted setting of the discharge speed of the dosing hopper 1, a material layer that is expected to be required is placed onto the conveyor belt of the continuously conveying dosing belt scale 2, and this material layer is uniformalized by the height-adjustable equalizing roller 16. With the aid of the weighing device 10 (belt loading) and the determined belt speed, the regulating unit 4 calculates an actual conveying rate as mass per time, with which the spreading head is being supplied with chips or fibers. Insofar as this deviates from the nominal rated conveying rate (kg/s), the regulating unit 4 will form therefrom a corresponding regulation deviation signal, whereby the belt speed will be correspondingly readjusted for regulation thereof by the drive motor 11.

If simultaneously the belt loading deviates from a prescribed value, the discharge speed out of the dosing hopper 1 will also simultaneously be correspondingly regulated by the regulating unit 4. Thereby, in a simple manner, the spreading quantity that is spread onto the forming belt 6 is exactly regulatable. Especially hereby, any inaccuracies or inexactitudes in the discharge out of the dosing hopper 1 can be exactly regulated-out, before a material fleece 5 that does not correspond to the panel thickness and width is spread onto the forming belt 6, which otherwise generally leads to panels of reduced quality.

Figure 2:
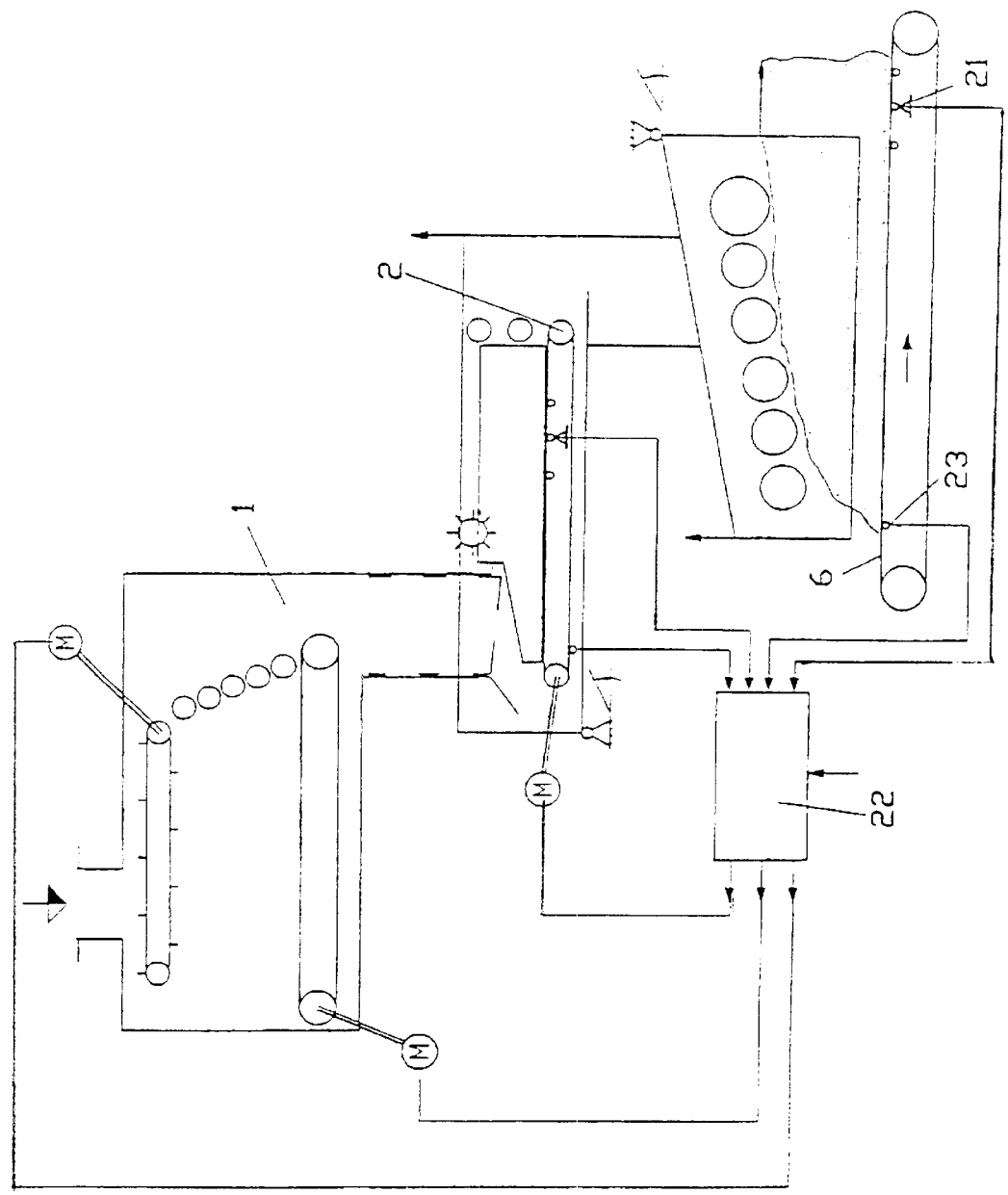
FIG. 2: a forming station with a dosing hopper, dosing belt scale, spreading head and forming belt with weight-per-unit-area scale.

In FIG. 2 of the drawing, a spreading station as according to FIG. 1 is similarly illustrated, whereby, however, a surface weight scale or weight-per-unit-area scale 21 is additionally provided in the forming belt 6. Moreover, the regulating unit 22 includes an additional input, to which the actual fleece weight on the forming belt 6 is supplied. The reference characters of FIG. 2 otherwise correspond to the functionally equivalent parts of FIG. 1 of the drawing. Insofar as the forming belt is not operated with a prescribed belt speed, an additional speed sensor 23 is still further provided, with the aid of which the conveying rate on the forming belt 6 is determinable. The mass of the fiber or chip fleece that is spread onto the forming belt 6 is very exactly determinable by the weight-per-unit-area scale 21 in the forming belt 6. The maintenance of the mass of the fleece on the forming belt 6 is an essential factor for the quality of the finished panels. Therefore, the weight-per-unit-area scale 21 makes it possible to achieve an improvement of the regulating accuracy in comparison to the embodiment according to FIG. 1 of the drawing, because hereby spreading inaccuracies or inexactitudes in the spreading head 3 are also able to be taken into consideration. Therefore, based on the desired panel thickness and width, simply the fleece weight or the fleece conveying rate prescribed therefor is inputtable as a rated value into the regulating unit 22. From that, the regulating unit 22 determines a certain discharge speed out of the dosing hopper 1 and a certain conveying rate on the dosing belt of the dosing belt scale 2. The regulation of the dosing belt scale 2 and of the dosing hopper 1 is carried out essentially as has already been described with reference to FIG. 1 of the drawing. However, a readjustment or after-regulating of the dosing belt scale 2 is carried out if the prescribed fleece weight is not maintained by the predetermined rated or nominal conveying rate. Thus, in connection with a deviation from the nominal or rated fleece weight, the nominal or rated conveying rate of the dosing belt scale 2 will be again newly determined and correspondingly regulated-out or readjusted by the regulating unit 22. By means of such a two-stage gravimetric regulation, the prescribed fleece weight is very exactly maintainable, because weight fluctuations in the chip or fiber material can be taken into account already at an early stage in the dosing belt regulation, so that the reject rate of the panel production can be minimized even in connection with production switch-overs or readjustments and changes. In this context, the regulating unit 22 may also be integrated into the dosing belt regulation. Such a regulation may, however, also be provided as a program control included in the control apparatus for the production control, whereby furthermore additional production parameters can also be taken into consideration.

What is claimed is:

1. Forming station comprising at least one dosing hopper, out of which a total material flow of flowable materials, comprising wood chips or fibers provided with a binder agent, is discharged onto a conveying apparatus and delivered by the conveying apparatus to at least one spreading apparatus, which spreads the total material flow of the chips or fibers in a controllable quantity to form a fleece thereof onto a forming belt, wherein the conveying apparatus comprises a dosing belt scale (2) which is arranged between the dosing hopper (1) and the spreading apparatus (3), and by means of which the an actual conveying rate of the total material flow on the dosing belt scale is determined as a mass per unit time, and further comprising a regulating unit, which regulates the conveying of the total material flow by the dosing belt scale based on the determined actual conveying rate (kg/s) and in consideration of a prescribed nominal conveying rate (kg/s).

2. Forming station according to claim 1, wherein said dosing belt scale comprises a conveyor belt, a gravimetric weighing apparatus (10) arranged to weigh a weight of the total material flow on the conveyor belt, and a belt speed detection apparatus (12) arranged to detect a conveyor belt steed of the conveyor belt, from which weight and conveyor belt speed the regulating unit (4) determines the actual conveying rate (kg/s), whereby the conveyor belt speed is regulated in connection with a deviation of the actual conveying rate from the prescribed nominal conveying rate (kg/s).

3. Forming station according to claim 1, wherein the dosing hopper includes discharge elements and the dosing belt scale includes a gravimetric weighing apparatus to weigh an actual belt loading of the dosing belt scale, and wherein the regulating unit (4) is embodied so that the speed of the discharge elements (7, 8) of the dosing hopper (1) is followingly regulated in connection with a determined deviation of the actual belt loading from a prescribed belt loading.

4. Forming station according to claim 1, wherein the dosing belt scale (2) is provided with adjustable side walls (15), which are adjustable corresponding to a desired width of the fleece.

5. Forming station according to claim 1, further comprising a weight-per-unit-area scale (21) provided in the forming belt (6), by means of which scale the actual fleece weight or the actual fleece conveying rate (kg/s) of the fleece is provided to the regulating unit (22) and is compared with a prescribed nominal fleece weight or a prescribed nominal fleece conveying rate, and in connection with a regulation deviation therebetween, the conveying rate of the dosing belt scale (2) is correspondingly readjusted and regulated.

6. Forming station according to claim 1, wherein the regulating unit (4, 22) is provided as a regulation of the dosing belt scale (2) or as a part of a program controlled production control.

7. A forming station for forming a fleece of a particulate material including glued wood chips or glued wood fibers, said forming station comprising:

at least one dosing hopper adapted to contain said particulate material, and including at least one controllable discharge element that is coupled to a first controllable drive and that discharges a material flow of said particulate material;

a dosing belt scale including a conveyor belt positioned to receive thereon said material flow of said particulate material discharged by said at least one dosing hopper, a gravimetric weighing apparatus arranged to detect a load weight of said particulate material on said conveyor belt and to provide a weight signal, a speed detection device arranged to detect a conveying speed of said conveyor belt and provide a speed signal, and a second controllable drive coupled to said conveyor belt;

a forming belt;

at least one spreading apparatus arranged and adapted to receive said material flow of said particulate material from said dosing belt scale, and to spread said particulate material onto said forming belt so as to form said fleece of said particulate material on said forming belt; and a regulating unit that is connected with said gravimetric weighing apparatus so as to receive said weight signal and with said speed detection device so as to receive said speed signal, and that is adapted to determine an actual conveying rate as a mass per unit time of said particulate material on said conveyor belt based on said weight signal and said speed signal and is adapted to compare said actual conveying rate to a prescribed nominal conveying rate so as to produce a regulation signal responsive thereto, and that is connected with said second controllable drive so as to control said second controllable drive responsive to said regulation signal.

8. The forming station according to claim 7, wherein said regulating unit is further connected with said first controllable drive so as to control said first controllable drive responsive to said regulation signal.

9. The forming station according to claim 8, wherein said at least one controllable discharge element comprises a controllable floor conveyor belt at a bottom of said dosing hopper.

10. The forming station according to claim 7, further comprising a vertical discharge shaft arranged below said at least one controllable discharge element and adapted to have said material flow of said particulate material fall from said dosing hopper downwardly therethrough onto said conveyor belt of said dosing belt scale, and a vertical delivery shaft arranged below an output end of said dosing belt scale and adapted to have said particulate material fall from said dosing belt scale downwardly therethrough into said spreading apparatus.

* * * * *

UNITED STATES PATENT AND TRADEMARK OFFICE
CERTIFICATE OF CORRECTION

PATENT NO.      : 6,679,694 B1
DATED           : January 20, 2004
INVENTOR(S)     : Henschel et al.

It is certified that error appears in the above-identified patent and that said Letters Patent is hereby corrected as shown below:

<u>Title page,</u>
Item [57], ABSTRACT,
Line 2, after "scale (2)", delete "to".

<u>Column 1,</u>
Line 48, after "its", delete "Ad";
Line 62, after "wood", replace "chins" by -- chips --.

<u>Column 2,</u>
Between lines 10 and 11, insert the following paragraph:

--The invention has the advantage, that the necessary material mass will always be delivered by means of the regulatable gravimetric metering or dosing before or in front of the spreading apparatus, whereby this material mass is necessary for a uniform spreading at a prescribed surface area weight or weight per unit area of the material fleece. Since the quality of the finished panel is dependent on a constant uniform weight of the spread-out material fleece, advantageously according to the invention, already the delivered material quantity can be regulated with respect to the weight in such a manner so that particularly in the start-up phase or a switch-over or readjustment phase of the production process, only a small amount of reject material will be produced.--;

Line 43, after "and", replace "to" by -- a --;
Line 64, before "pulses,", replace "generates-voltage" by -- generates voltage --.

Signed and Sealed this

Sixth Day of April, 2004

JON W. DUDAS
*Acting Director of the United States Patent and Trademark Office*